United States Patent [19]
Kanno

[11] Patent Number: 5,058,189
[45] Date of Patent: Oct. 15, 1991

[54] APPARATUS AND METHOD FOR AREA DESIGNATION ON A DOCUMENT

[75] Inventor: Hiroshi Kanno, Shiroishi, Japan

[73] Assignee: Ricoh Company, Ltd., Japan

[21] Appl. No.: 310,520

[22] Filed: Feb. 13, 1989

[30] Foreign Application Priority Data

Feb. 16, 1988 [JP] Japan .................................. 63-31951

[51] Int. Cl.$^5$ .............................................. G06K 9/00
[52] U.S. Cl. ........................................ 382/61; 382/54; 382/48; 382/49; 358/183
[58] Field of Search ....................... 382/48, 49, 61, 27, 382/54; 358/183

[56] References Cited

U.S. PATENT DOCUMENTS

| | | | |
|---|---|---|---|
| 3,970,991 | 7/1976 | Kawada et al. | 382/48 |
| 4,644,585 | 2/1987 | Crimmins et al. | 382/49 |
| 4,856,074 | 3/1988 | Nagaoka | 382/48 |
| 4,901,365 | 12/1988 | Kelland | 382/48 |
| 4,907,285 | 3/1990 | Nakano et al. | 382/61 |
| 4,933,979 | 6/1990 | Suzuki et al. | 382/61 |

FOREIGN PATENT DOCUMENTS 55-34723  3/1980  Japan .
57-89371  3/1982  Japan .
58-92057  1/1983  Japan .
61-13867  1/1986  Japan .

Primary Examiner—Leo H. Boudreau
Assistant Examiner—Rohini Khanna
Attorney, Agent, or Firm—Mason, Fenwick & Lawrence

[57] ABSTRACT

A method for designating a rectangular area on a document includes the following procedure. During a first step, data of a pixel of concern and data of pixels adjacent thereto are read out from a first memory by scanning the memory in accordance with each of four combinations of main and sub scanning directions. Next, a first logic operation is carried out with respect to the pixel data. During a third step, a result of the first logic operation is stored in the first memory. Then, a second logic operation is performed on the result of the first logic operation which is obtained in each combination of the scanning directions. A group of results of the second logic operation with respect to each pixel represents the rectangular area which has the drawn figure as an inscribed figure and is filled with pixel data having a value identical to that of pixel data forming a contour image of the drawn figure. An apparatus for carrying out the method is also provided.

22 Claims, 11 Drawing Sheets

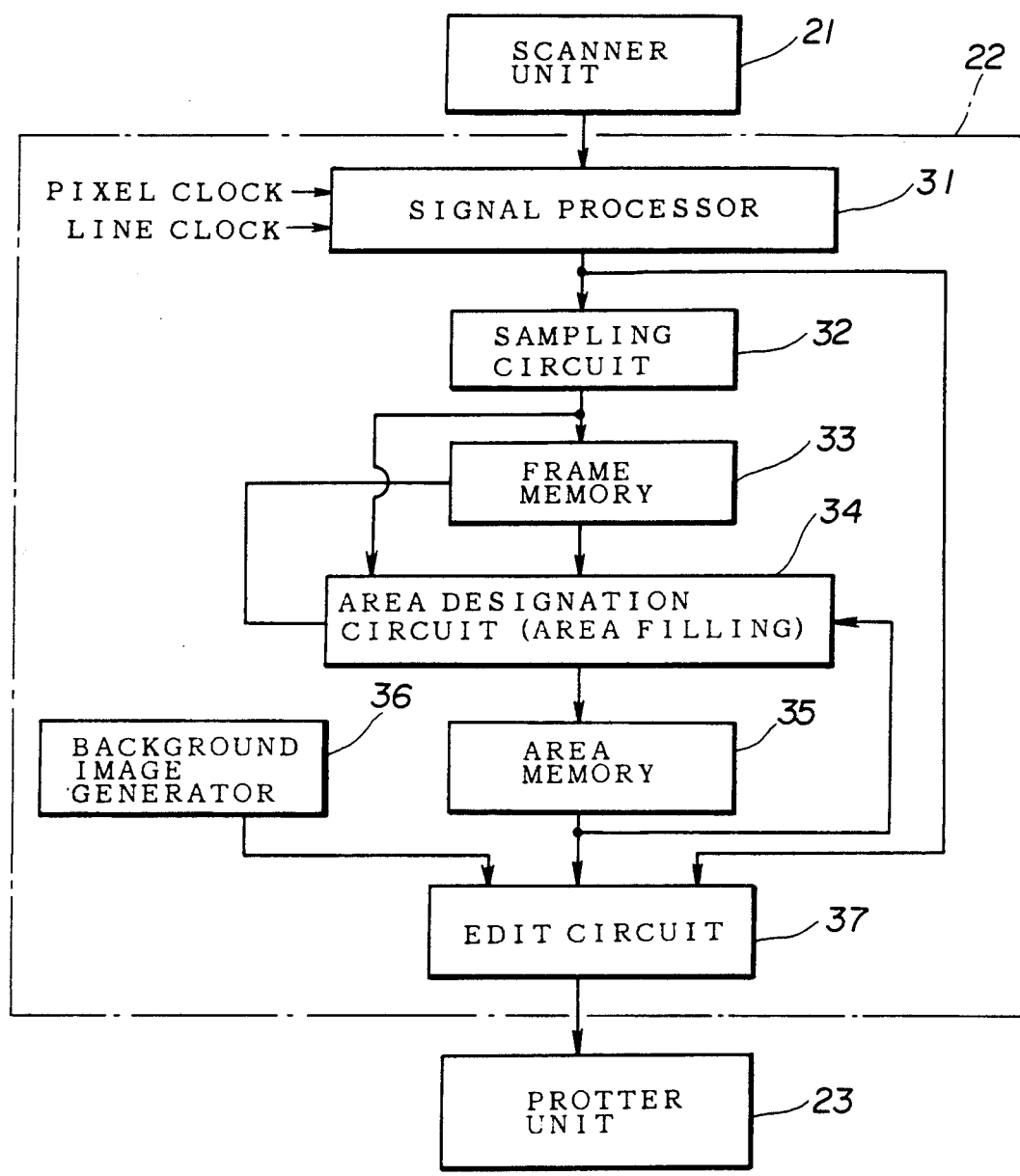

FIG. 5B
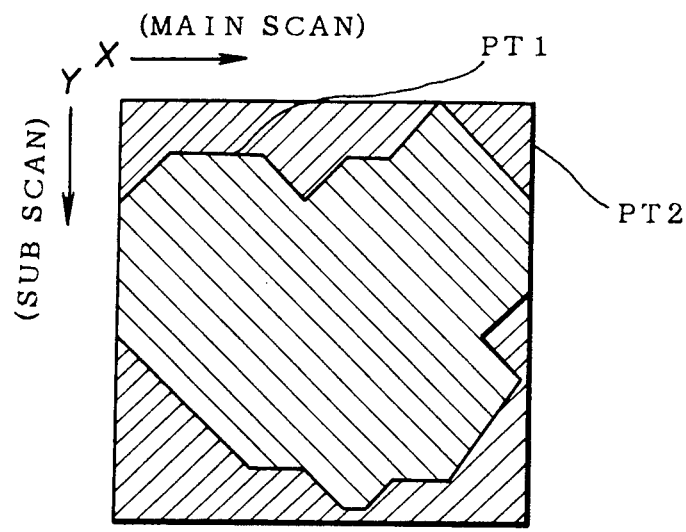
FIG. 6
FIG. 7
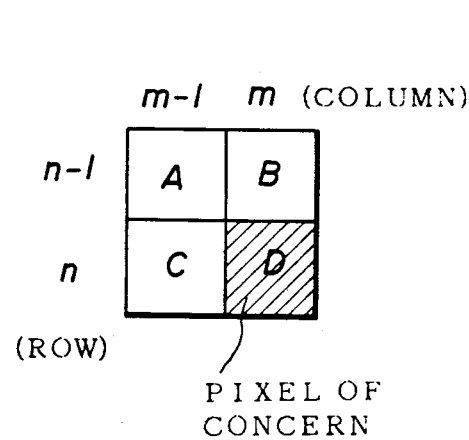

MAIN SCAN L→R SUB SCAN U→D

R→L U→D

L→R D→U

R→L D→U

APPARATUS AND METHOD FOR AREA DESIGNATION ON A DOCUMENT

BACKGROUND OF THE INVENTION

The present invention generally relates to an apparatus and method for area designation on a document, and more particularly to an apparatus and method for designating a rectangular area on a document, which can be used when printing a document image such as a character image on paper together with a background image covering a particular area of the paper. Further, the present invention relates to a printing apparatus which employs a means for designating a rectangular area on a document. The present invention is suitable particularly for an image processing apparatus such as a digital copier having an edit function.

Currently, a plain paper copier (PPC) having an edit function is marketed. In such a copier, the edit function makes it possible to extract or delete a particular area from a document. In the edit function, it is necessary to designate an area which is subjected to editing. Hereinafter, such an area is referred to as an edit area.

Various methods for designating an edit area have been proposed. A first method uses a numeric keypad. By key operation, an operator inputs values of X-Y coordinates of corners of a rectangular edit area which the operator wishes to designate. A second method uses an X-Y tablet. An operator touches, with a pen or the like, apexes of an area which the operator wishes to designate. In a third method, the operator designates an edit area by drawing a contour line of the edit area directly on a document by using a pen or the like. The contour line must have a halftone between the tone of an image on the document and the tone of the blank background of the document. A fourth method uses a particular sheet, which normally is the same size as the document. An edit area contour line is drawn on the particular sheet (hereinafter, such a sheet is referred to as an edit area sheet). The edit area sheet is a command sheet, which is optically scanned and the edit area is read. Thereafter, the document is scanned and document data is read therefrom.

However, the aforementioned first method has certain disadvantages in that the input operation is difficult and often leads to errors because it is necessary to measure X-Y coordinates on the document. The second method allows easy input operation, but has a disadvantage in that conventional X-Y tablets are expensive and the operator cannot visually confirm the result of the area designation. The disadvantage of the third method is that the document often becomes dirty. Additionally, if the document has a halftone image such as a photograph, the halftone image is mistaken for an edit area.

Finally, the fourth method does not have problems as described above, and is suitably applied to an image processing apparatus such as a digital copier which handles image data in digital form. It is conceivable to apply the method proposed in the U.S. patent application Ser. No. 164,901 to the fourth method in order to handle the command document. That is, an edit area document on which an edit area is represented by a corresponding figure formed by a closed loop, is optically scanned, and corresponding electrical document image data is stored in an image memory. Next, an inner area of the closed-loop figure is filled with data identical to data of the contour image line of the closed-loop figure. Generally, the contour image line is represented by binary digits, i.e., 1. Thereby, the inner area of the closed-loop figure is filled with binary digits 1, and a portion outside the closed-loop figure is filled with binary digits 0. Thereafter, data is read out from the image memory in synchronism with optical scanning of the document. Then a conjunction (AND) operation is carried out on image data read out from the image memory and document data read out from the document. Document image data having a value (binary digit) of 0 represents a white pixel, and document image data having a value of 1 represents a black pixel. On the other hand, image data of the edit area sheet having a value of 0 represents a pixel outside the closed-loop figure, and image data thereof having a value of 1 represents a pixel on or inside the closed-loop figure. As a result of the conjunction operation, image data is formed within the designated edit area. In other words, document image data outside the closed-loop figure in the conjunction operation result is deleted from the entire document image data.

However, the fourth method presents some problems when applied under the following circumstances. As is frequently seen in the headline of a newspaper and the like, characters are printed on paper together with a background image. In most cases, the background image is printed within a rectangular edit area. It is now assumed that a background image area is designated by drawing by hand a corresponding rectangular closed-loop figure on the edit area sheet. Generally, it is very difficult to draw by hand rectangular figures with perfectly straight lines. In other words, freehand rectangular figures contain lines that are wavy and deformed. Therefore, the background image printed on the edit area designated by the wavy freehand rectangular figure also has a wavy and deformed contour. On the other hand, even if a figure is drawn by using a ruler, when a slight positional error exists between a raster scanning direction and a contour line of the drawn figure, the corresponding background image area has a jagged contour.

SUMMARY OF THE INVENTION

It is therefore a general object of the present invention is to provide a novel and useful apparatus and method for designating a rectangular area on a document in which the aforementioned disadvantages are eliminated.

A more specific object of the present invention is to provide an apparatus and method for designating a rectangular area on a document, in which even if the rectangular-area designation is carried out by free-hand drawing of a shape on an edit area document, a rectangular background image area having perfectly straight contour lines can be generated from the freehand shape.

The above objects of the present invention can be achieved by a method for designating a rectangular area on a document which comprises the steps of storing pixel data of a sheet having a figure drawn thereon for area designation in a memory; sequentially reading out data of a pixel of concern and data of pixels adjacent thereto from the memory by scanning the memory in accordance with each of four combinations of the main and sub scanning directions; performing a first logic operation with respect to the pixel data read out from the memory in each combination of the scanning directions; storing the results of the first logic operation stored in the memory; and performing a second logic operation on the result of the first logic operation which is obtained in each combination of the scanning directions. A group of the results of the second logic operation with respect to each of the scanned pixels represents the rectangular area which has the drawn figure as an inscribed figure and is filled with pixel data having a value identical to that of pixel data forming a contour image of the drawn figure.

The above objects of the present invention can be also achieved by an apparatus for designating a rectangular area on a document, where the apparatus comprises the following elements. A first memory stores pixel data of a sheet having a figure drawn thereon for area designation. A second memory stores the results of a first logic operation. A reading circuit sequentially reads out data of a pixel of concern and data of pixels adjacent thereto from the first and second memories by scanning the first and second memories in accordance with each of four combinations of main and sub scanning directions. A logic operation circuit performs the first logic operation with respect to the pixel data read out from the first and second memories in each combination of the scanning directions. Another logic circuit performs a second logic operation on the results of the first logic operation which is obtained in each combination of the scanning directions. A third memory stores the results of the second logic operation with respect to each pixel. A group of the results of the second logic operation with respect to each pixel represents the rectangular area which has the drawn figure as an inscribed figure and is filled with pixel data having a value of a contour image of the drawn figure.

Still another object of the present invention is to provide a print apparatus having an edit function having the aforementioned rectangular area designation processing. This object can be achieved by a print apparatus comprising the following elements. A scanner optically scans a document to produce document image data. A first memory stores pixel data of a sheet having a figure drawn thereon for area designation. A second memory stores the results of a first logic operation.

A read circuit sequentially reads out data of a pixel of concern and data of pixels adjacent thereto from the first and second memories by scanning the first and second memories in accordance with each of four combinations of main and sub scanning directions. An operation circuit performs the first logic operation with respect to the pixel data read out from the first and second memories in each combination of the scanning directions. Another operation circuit performs a second logic operation on the result of the first logic operation which is obtained in each combination of the scanning directions. A third memory stores the results of the second logic operation with respect to each pixel. A group of the result of the second logic operation with respect to each pixel represents the rectangular area which has the figure drawn as an inscribed figure and is filled with pixel data having a value of a contour image of the drawn figure.

A generator generates data of a background image. A signal processing circuit performs a predetermined signal processing with respect to the background image data, the result of the second logic operation stored in the third memory, and the document image supplied from the scanner means to generate a print signal. A print mechanism prints an image produced by the print signal on paper, the document image being printed on the paper together with the background image within the rectangular area.

Other objects, features and advantages of the present invention will become apparent from the following detailed description when read in conjunction with the accompanying drawings.

BRIEF DESCRIPTION OF THE DRAWINGS

FIG. 4 is a block diagram of the signal processing unit of FIG. 3;

FIGS. 5A and 5B are symbolic views illustrating the principle of the present invention;

FIG. 6 is a symbolic view of a figure image stored in a bit map memory;

FIG. 7 is a symbolic view showing positions of pixels which are used in area filling processing;

FIGS. 8A through 8F are symbolic views showing changes of contents in the bit map memory at different steps of the area filling processing;

DESCRIPTION OF PREFERRED EMBODIMENTS

Before describing a preferred embodiment of the present invention, a description is now given of disadvantages of the conventional fourth method described previously, with reference to FIGS. 1A through 1C and FIG. 2.

Figure 1A:
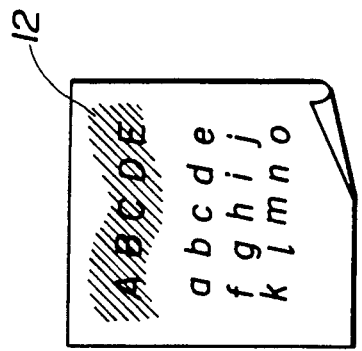
FIGS. 1A through 1C are schematic views of sheets used in illustrating problems of a conventional edit area designation method.
Figure 1B:
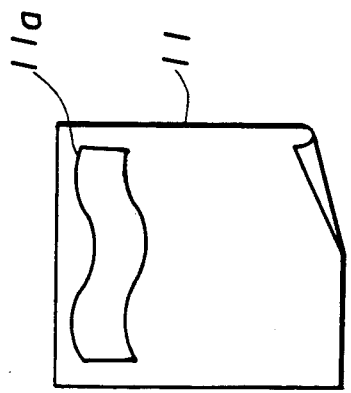
Figure 1C:
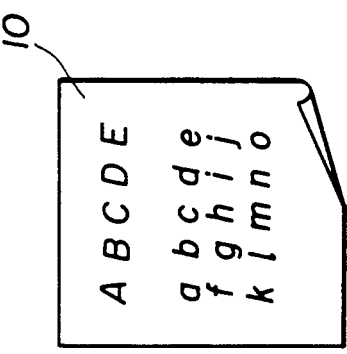
Figure 2:
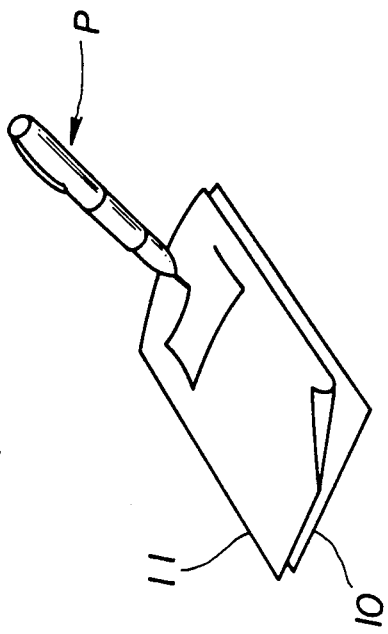
FIG. 2 is a schematic view illustrating how to use an edit area document.

FIG. 1A shows a document 10, FIG. 1B shows an edit area sheet, and FIG. 1C shows an image printed on paper. It is now assumed that a character string consisting of "ABCDE" on the document 10 of FIG. 1A is printed together with a background image 12 which consists of a plurality of oblique lines shown in FIG. 1C. The edit area sheet 11 of FIG. 1B is identical in size to the document 10. This enables an easy sheet alignment operation in which the editarea sheet 11 overlays the document 10. In this state, as shown in FIG. 2, an operator draws by hand on the edit area sheet 11 a figure with a pen in such a way that it surrounds the area in which the operator wishes to print the background image. The edit area sheet 11 must be optically transparent or semi-transparent. Thin paper (high-quality 55 kg paper, for example) may be used as the edit area sheet 11. It is preferable to use a pen which can draw a thick line. A felt-tip pen or water-based pen is suitable as the pen P. As shown in FIG. 1B, the contour line of the handwritten area 11a on the edit area sheet 11 is not straight but wavy. That is, the freehand area 11a is deformed. Therefore, as shown in FIG. 1C, the background image 12 with respect to the characters "ABCDE" is wavy. It is noted that even when a closed-loop figure for the edit area designation is drawn by using a ruler, jagged portions appears in contour portions of the printed background image.

The present invention intends to overcome the above-mentioned disadvantages.

A description is given of a preferred embodiment of the present invention.

Figure 3:
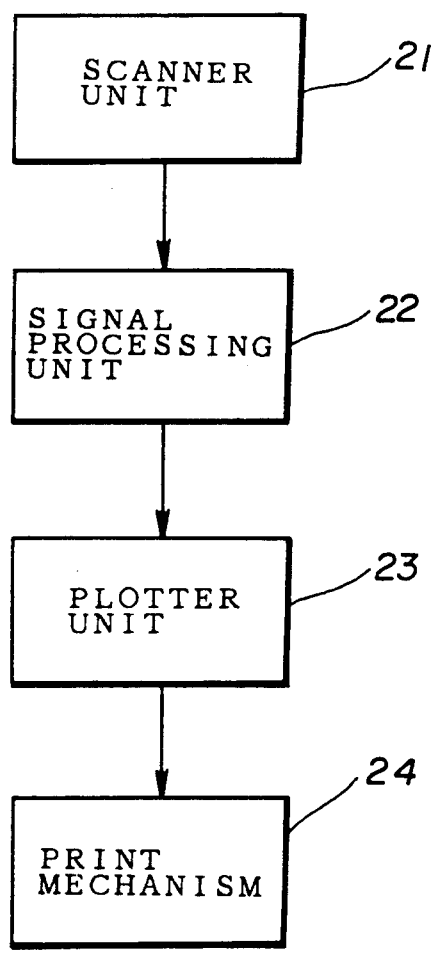
FIG. 3 is a schematic block diagram of a copier embodying the teachings of the present invention.

FIG. 3 is a schematic block diagram of a digital copier which employs an embodiment of the present invention. An example of the digital copier of FIG. 3 is the digital copier named "PRIPORT SS 950", which is marketed by RICOH COMPANY LTD. Referring to FIG. 3, the copier includes a scanner unit 21, a signal processing unit 22, a plotter unit 23 and a PPC/plate-making print mechanism 24 (hereinafter simply referred to as a print mechanism). The scanner unit 21 raster-scans a document 10 of FIG. 1A, and converts optical image information to a corresponding electric image signal. The image signal in analog form is converted to a digital image signal by a signal processing unit 22. Then, the signal processing unit 22 subjects the digital image signal to various types of image processing such as halftone processing and enlargement/reduction processing, and supplies the plotter unit 23 with a processed image signal. The plotter unit 23 writes the image signal into the print mechanism 24. In the case where the operation of the print mechanism 24 is based on the PPC process, a built-in photosensitive drum is exposed through a method such as laser scanning, light-emitting diode (LED), and liquid crystal shutter. Alternatively, in the case where the operation of the print mechanism 24 is based on the plate-making print process, the image signal is written on thermal paper by a built-in thermal head.

When the document 10 is to be scanned, the edit area sheet 11 is set in the scanner unit 21, and is then optically scanned. The edit area sheet 11 is scanned prior to the scanning of the document 10. In a normal mode where the document 10 is scanned, the plotter unit 23 writes the image data into the print mechanism 24 in synchronism with the scanning operation in the scanner unit 21. On the other hand, in an edit area sheet processing mode, the plotter unit 23 is kept in an inactive state.

The detailed structure of the signal processing unit 22 is illustrated in FIG. 4. Referring to FIG. 4, the signal processing unit 22 includes a signal processor 31, a sampling circuit 32, a frame memory 33, an area designation circuit 34, an area memory 35, a background image generator 36, and an edit circuit 37.

The following explanation describes the situation where the edit area sheet 11 is set in the scanner unit 21. The image data of the edit area sheet 11 supplied from the scanner unit 21 is subjected to various types of customary image processing such as A/D conversion, enlargement and reduction processing. Then the processed image signal is sampled by the sampling circuit 32 in order to reduce the quantity of data to be processed. Sampled image data is supplied to the area designation circuit 34. The area designation circuit 34 subjects the image data to an area filling process. It is noted that the edit area designation is performed based on the area filling processing. Some image data from the area designation circuit 34 is stored in the frame memory 33. The image data read out from the frame memory 33 is also subjected to the area filling processing. An output signal generated by the area filling processing is stored in the area memory 35. Sampled data stored in the area memory 35 is fed back to the area designation circuit 34, and is used again in the area filling process. The background image data generator 36 can generate data representative of various background images.

After the edit area sheet is scanned, the document 10 of FIG. 1A is set in the scanner unit 21. Then, the document 10 is scanned by the scanner unit 21, which sends image data to the edit circuit 37 via the signal processor 31. In synchronism with this operation, the edit area data is read out from the area memory 35, and is supplied to the edit circuit 37. At the same time, desired background image data derived from the background image data generator 36 is supplied to the edit circuit 37. The edit circuit 37 carries out a suitable logic operation with respect to the received data. The results of the logic operation are supplied to the plotter unit 23.

The area designation circuit 34 is an essential part of the embodiment of the present invention. The area designation circuit 34 performs the area filling process, whereby a rectangular area which has an inscribed figure that is drawn as the edit area on the edit area sheet 11 by the operator, can be designated. The principle of operation of the area designation circuit 34 is summurized below, with reference to FIGS. 5A and 5B.

FIG. 5A shows an image data (pixel data) pattern I read out from the edit area sheet 11. The image data pattern I includes a contour image which consists of binary digits 1 and corresponds to a figure drawn by hand on the edit area sheet 11. FIG. 5A also shows an image data pattern II obtained after area filling process. It can be seen from FIG. 5A that a rectangular pattern filled with binary digits 1 is generated from the image data pattern I. Referring to FIG. 5B, a shaded figure PT1 corresponds to an inner area of the contour image included in pattern I, and a shaded figure PT2 corresponds to the rectangular image included in pattern II. As shown, the rectangular figure PT2 includes the figure PT1 as an inscribed figure. The rectangular figure PT2 is the rectangular edit area generated from the handwritten figure PT1. It is noted that boundary lines of the rectangular pattern included in pattern II are parallel to the main scanning direction (X direction) and sub scanning direction (Y direction).

A further description is given of the area filling process with respect to image data which are expanded on a storage area of a bit map memory. A bit map memory having a size of 7 rows by 7 columns is now considered for the sake of simplicity of the explanation.

Referring to FIG. 6, a rhombic figure consisting of binary digits 1 is expanded on a 7×7 bit map memory. The raster scan starts from a pixel located at address (1, 1), where the first numeral in the parenthesis indicates a row (or line) address, and the second numeral indicates a column address. Then bit map memory is scanned in the X direction. After a pixel at address (1, 7) is scanned, a pixel at address (2, 1) is scanned. Then the second row is scanned rightward. In this manner, all the pixels included in the bit map memory are scanned. During the scanning operation, a decision is made, based on conditions described later, as to whether or not a value 1 should be written into a one-bit pixel area (or a pixel position) being processed on the bit map. When the decision result is affirmative, a value 1 is written into the above pixel area, even if the pixel data located at the above address area has a value of 0. On the other hand, when the decision is negative, the pixel data being processed is maintained as it is. The above-described operation is carried out for every pixel in the bit map memory.

The following is a description of the conditions used at the time of decision making to determine whether or not a value 1 should be written into the pixel area of concern on the bit map. Referring to FIG. 7, D denotes a pixel of concern and also denotes pixel data. The pixel (data) D is indicated with address (n, m). In order to determine whether or not a value 1 should be written into the pixel area at address (n, m), two adjacent pixels B and C are used, in which the pixel B is positioned at address (n−1, m), and the pixel C is positioned at (n, m−1).

The conditions for deciding whether or not a value 1 should be written into a pixel area on the bit map being processed, are as follows.

(1) In the case where the pixel data D being processed has a value 1, a value 1 is written into the pixel area (n, m). In other words, the pixel data D is replaced with 1.

(2) In the case where the pixel data D of concern has a value 0, and each of the pixel data B and C has a value 1, a value 1 is written into the pixel area (n, m).

(3) In cases other than the above cases (1) and (2), a value 0 is written into the pixel area (n, m).

The above-described conditions can be represented by the following logical expression:

$$(B \times C) + D \rightarrow D \qquad (1)$$

According to the formula (1), an AND operation on pixel data B and C is carried out. Then an OR operation is carried out with respect to the pixel data D and the result of the AND operation. Then the pixel data D is substituted with the result of the OR operation.

After the pixel data at (n, m) has been processed, the pixel data at (n, m+1) is processed. That is, the pixel data at (n, m+1) becomes the pixel D. It is noted that when the pixel data D is processed, the pixel data A and B belonging to the preceding line have already been processed. Therefore, the pixel data A and B already have respective data values determined by the formula (1). Similarly, the pixel data D already has a data value determined by the formula (1). In this manner, data of all the 49 pixels expanded on the bit map memory are sequentially processed.

Figures 8A, 8B, 8C, 8D, 8E, 8F:
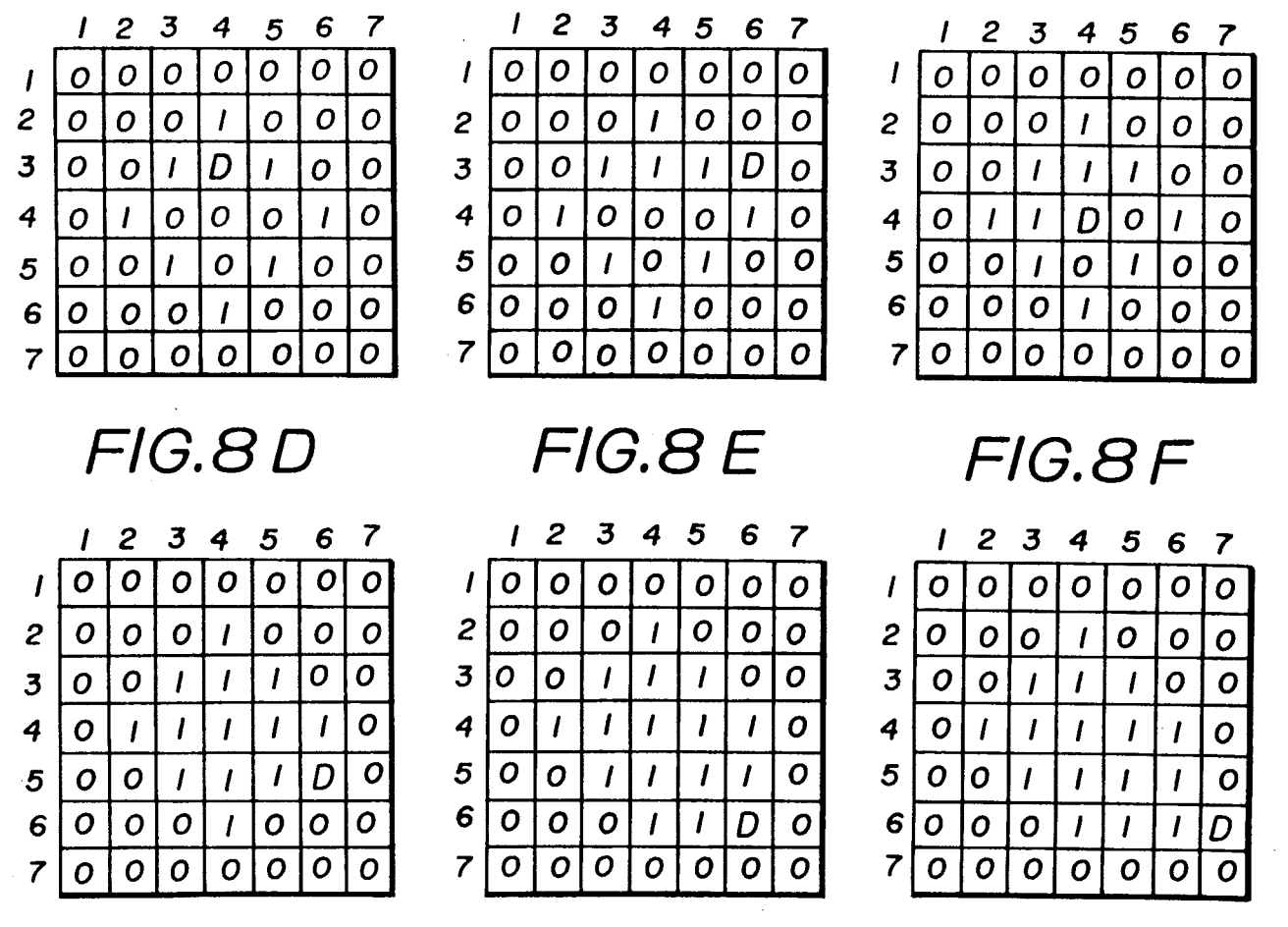

FIGS. 8A through 8F show intermediate steps of the area filling processing. Referring to FIG. 8A, the pixel data D of concern is positioned at (3, 4). Since B=1, C=1 and D=0, pixel data D is set to 1 according to condition (2). That is, the pixel area D is filled with 1.

Referring to FIG. 8B, the pixel data D of concern is positioned at (3, 6). Since B=0, C=1 and D=0, the pixel data D is set to 0 according to condition (3).

Referring to FIG. 8C, the pixel data D of concern is positioned at (4, 4). Since B=1, C=1 and D=0, the pixel data D is set to 1 according to condition (2).

Referring to FIG. 8D, the pixel data D of concern is positioned at (5, 6). Since B=1, C=1 and D=0, the pixel data D is set to 1 according to condition (2).

Referring to FIG. 8E, the pixel data D of concern is positioned at (6, 6). Since B=1, C=1 and D=0, the pixel data D is set to 1 according to condition (2).

Referring to FIG. 8F, the pixel data D of concern is positioned at (6, 7). Since B=0, C=1, and D=0, the pixel data D is set to 0 according to condition (3).

In this manner, data of all of the 49 pixels are processed. It can be seen from FIG. 8F that the inner area of the rhombic figure and an area on a lower right-hand side of the bit map memory are filled with binary digits 1.

Figure 9:
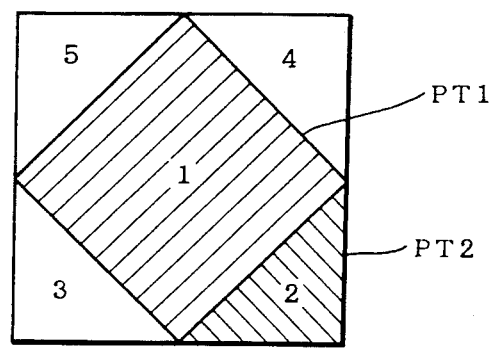
FIG. 9 is a symbolic view showing an generated edit area that consists of 5 inner segment areas in which areas 1 and 2 are filled with binary digits 1 by the data filling operation where the main scan is performed rightward and the sub scan is performed downward.

FIG. 9 is a view corresponding to FIG. 8F. As can be seen from FIG. 9 that binary digits 1 are written into an area 1 and an area 2 which are segment portions in a rectangular figure having the area 1 as an inscribed rhombic FIG. 1.

Figure 10A:
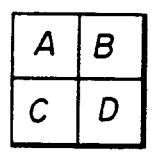
FIGS. 10A through 10D are symbolic views illustrating combinations of the main scanning direction and sub scanning direction.

The area filling process consists of four modes as shown in FIGS. 10A through 10D. The four modes depend on combinations of the directions of the main and sub scans. In the case of FIG. 10A, the main scanning direction is set rightward (left to right; L→R), and the sub scanning direction is set downward (up to down; U→D). In this case, positions of the pixels A, B and C with respect to the pixel D are defined as shown in FIG. 10A. In the mode of FIG. 10A, the areas 1 and 2 inside the rectangular pattern PT2 of FIG. 9 are filled with binary digits 1, as described previously.

Figure 10B:
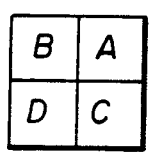

In FIG. 10B, the main scanning direction is set leftward (R→L), and the sub scanning direction is set downward (U→D). In this case, positions of the pixels A, B and C with respect to the pixel D are defined as shown in FIG. 10B. In the mode of FIG. 10B, the areas 1 and 3 are filled with binary digits 1.

Figure 10C:
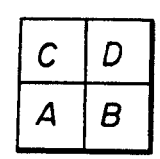

In FIG. 10C, the main scanning direction is set rightward (L→R), and the sub scanning direction is set upward (D→U). In this case, positions of the pixels A, B and C with respect to the pixel D are defined as shown in FIG. 10C. In the mode of FIG. 10C, areas 1 and 4 are filled with binary digits 1.

Figure 10D:
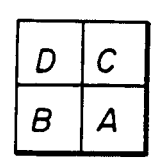

In FIG. 10D, the main scanning direction is set leftward (R→L), and the sub scanning direction is set upward (D→U). In this case, positions of the pixels A, B and C with respect to the pixel D are defined as shown in FIG. 10D. In the mode of FIG. 10D, areas 1 and 5 are filled with binary digits 1.

As a result, when a logical add (OR) is calculated with respect to results obtained by the aforementioned area filling process, the inner area of the rectangular pattern PT2 is completely filled with 1.

Figure 11:
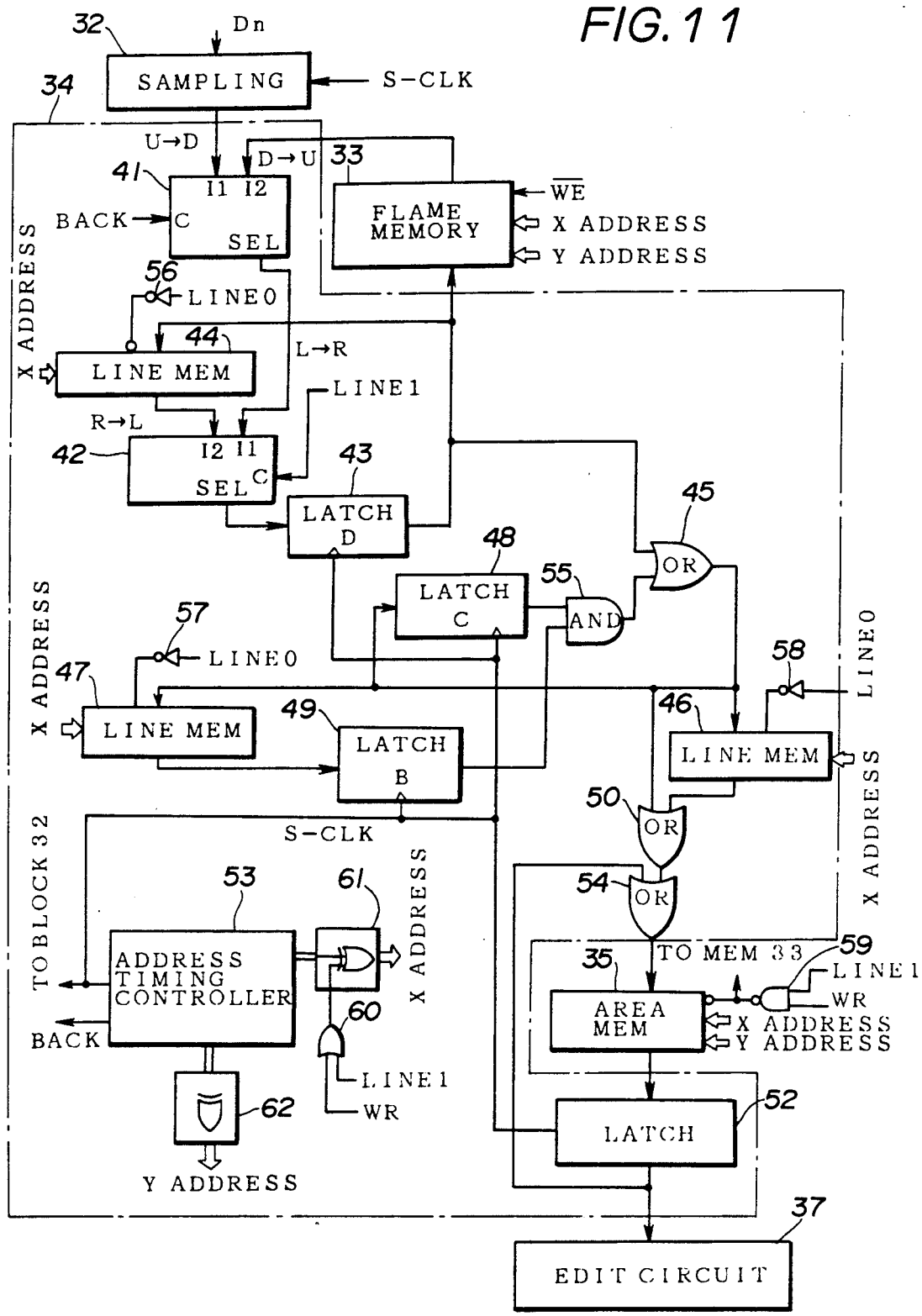
FIG. 11 is a circuit diagram of the area designation circuit shown in FIG. 4.

A detailed description is given of a preferred embodiment of the area designation circuit 34 with reference to FIG. 11. In FIG. 11, those elements which are the same as those in the previous figures are given the same reference numerals.

The image data or pixel data read out from the sampling circuit 32 is supplied to an input terminal I1 of a selector 41, which is controlled in accordance with the direction of the sub scan. The other input terminal I2 of the selector 41 is supplied with pixel data read out from the frame memory 33. A selector control signal BACK is generated by an address timing controller 53, and is supplied to a control terminal C of the selector 41. When the selector control signal BACK is kept at a low level, the up-to-down sub scan is selected. At this time, the selector 41 selects the input terminal I1. On the other hand, when the selector control signal BACK is maintained at a high level, the down-to-up sub scan is selected. At this time, the selector 41 selects the input terminal I2. The selected pixel data from the selector 41 is supplied to an input terminal I1 of a selector 42, which is controlled in accordance with the direction of the main scan. The other input terminal I2 of the selector 42 is supplied with an output signal of a line memory 44. A selector control signal LINE1 is supplied to a control terminal C of the selector 42. When the control signal LINE1 is at the low level, the left-to-right main scan is selected. At this time, the selector 42 selects the input terminal I1. On the other hand, when the control signal LINE1 is kept at the high level, the right-to-left main scan is selected. At this time, the selector 42 selects the input terminal I2. The output signal of the selector 42 is supplied to a latch circuit 43 used for latching the pixel data D. The output signal of the latch circuit 43 is supplied to the frame memory 33, the line memory 44 and an OR gate 45. A latch circuit 48 latches the pixel data C, and a latch circuit 49 latches the one-bit pixel data B. The latch circuits 43, 48 and 49 latch the respective pixel data D, C and B in response to a sampling clock S-CLK, which is generated by the address timing controller 53. The sampling clock S-CLK is supplied also to the sampling circuit 32. Therefore, the latch circuit 43 latches the sampled image data for every one pixel. An AND gate 55 performs an AND operation between the pixel data B and C. A result of the AND operation is supplied to the OR gate 45. An output signal of the OR gate 45, which corresponds to the formula (1), is supplied to a line memory 46, an OR gate 50 and a line memory 47.

A control signal LINE0 is supplied to an inverter 56, an output signal of which is supplied, as a write enable signal $\overline{WE0}$, to the aforementioned line memory 44. The control signal LINE0 is supplied also to an inverter 57, which outputs a write enable signal $\overline{WE0}$ to the line memory 47, which has a memory region amounting to two lines. The control signal LINE0 is supplied also to inverter 58, an output of which is supplied, as a write enable signal $\overline{WE0}$, to the line memory 58. The line memories 44, 46 and 47 are connected to an X address, which is supplied from an exclusive OR gate 61 (hereinafter simply referred to as an EOR gate). An output signal of the line memory 46 and the output signal of the OR gate 45 are supplied to an OR gate 50. An output signal of the OR gate 50 is supplied to an input terminal of an OR gate 54. The other input terminal of the OR gate 54 is supplied with an output signal of a latch circuit 52. An output signal of the OR gate 54 is supplied to the area memory 35. The control signal LINE1 and a control signal WR are supplied to a NAND gate 59, an output signal of which is supplied, as a write enable signal $\overline{WE}$, to the area memory 35. The X and Y addresses are supplied to the area memory 35 and the frame memory 33. Each of the frame memory 33 and the area memory 35 corresponds to the aforementioned bit map memory. The address timing controller 53 generates the X and Y addresses, the sampling clock S-CLK, and the control signal WR. The Y address derived from the address timing controller 53 is supplied to an exclusive OR gate 62, to which the control signal BACK is supplied. The control signals LINE0 and LINE1 are supplied from an external circuit such as a central processing unit (not shown).

Figure 12:
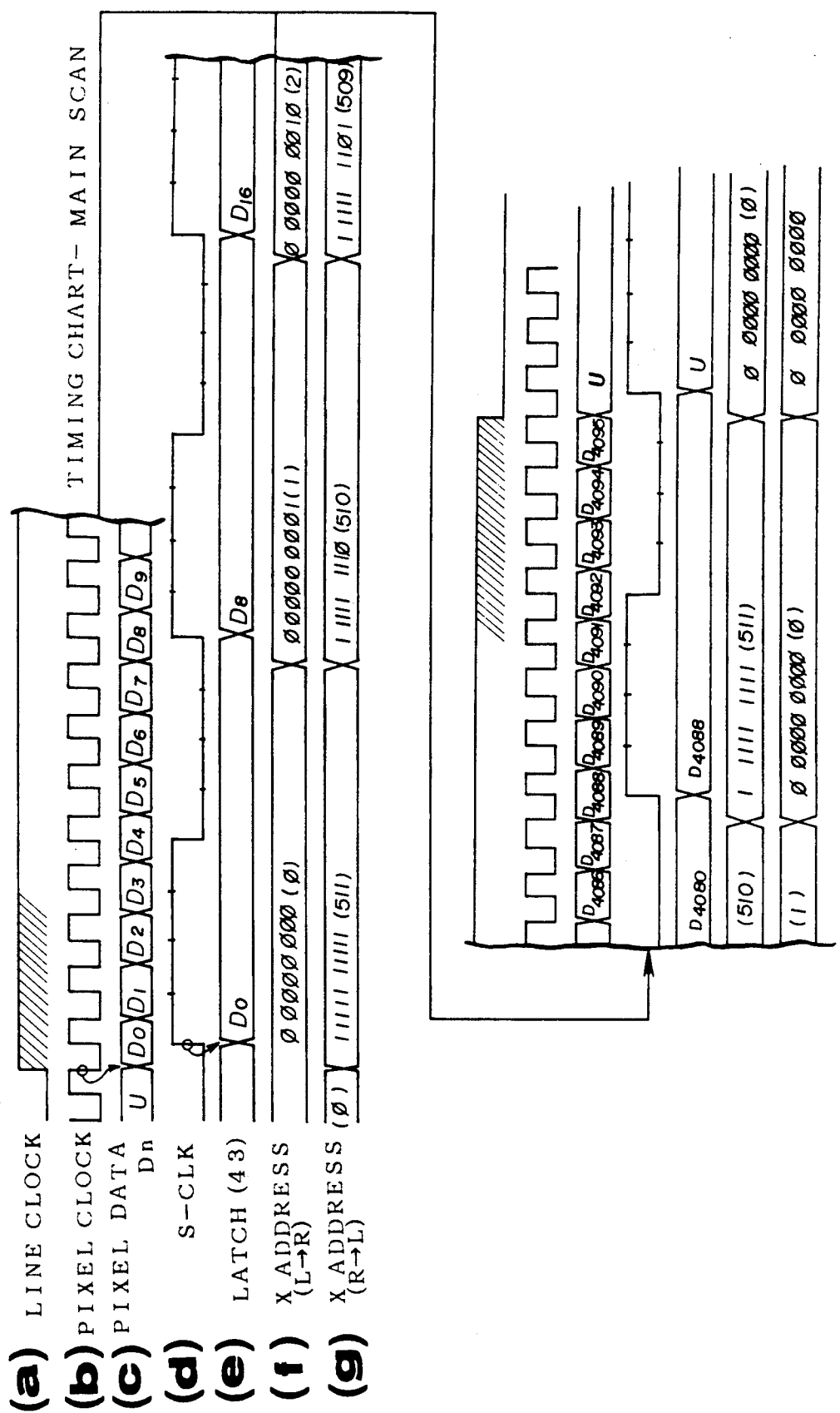
FIG. 12 is a timing chart which illustrates signals appearing in the circuit of FIG. 11 with respect to the main scan.
Figure 13:
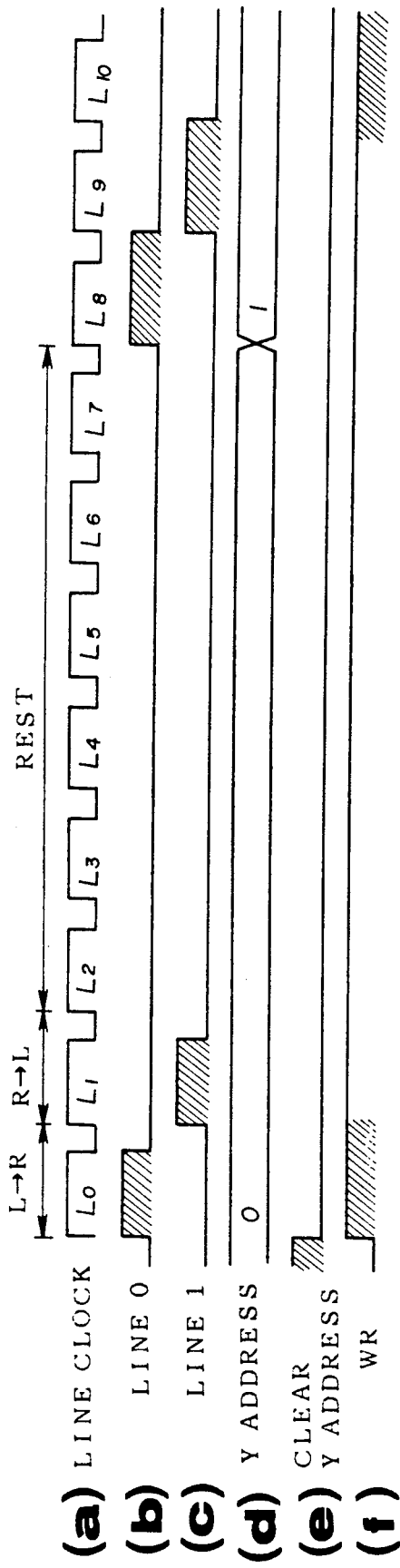
FIG. 13 is a timing chart illustrating signals in the circuit of FIG. 11 with respect to the sub scan.
Figure 14:
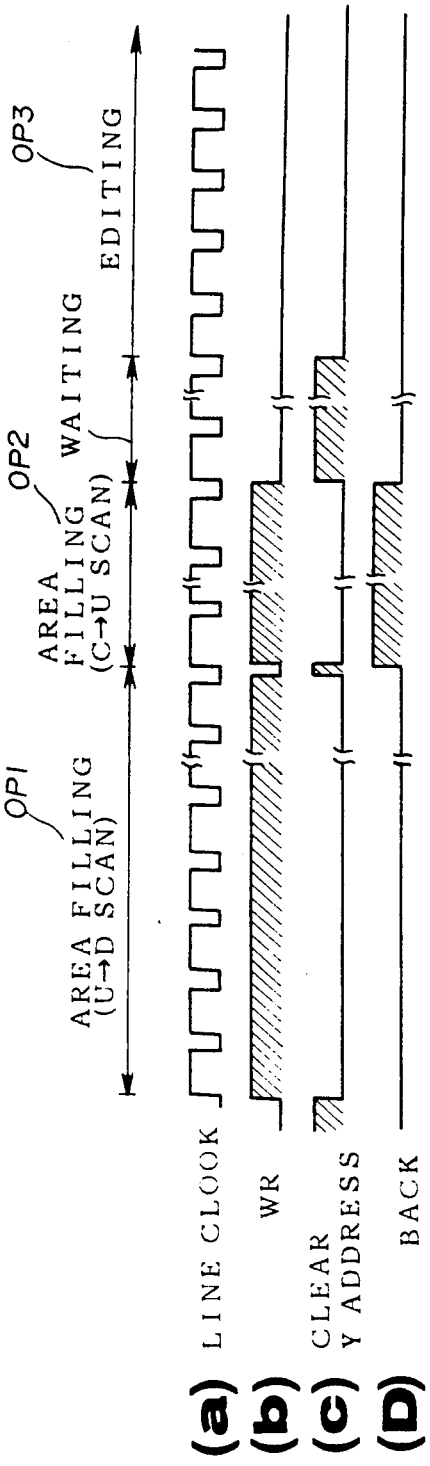
FIG. 14 is a timing chart illustrating signals for describing the entire area filling operation.

A description is given of the operation of the area designation circuit 34 of FIG. 11, with reference to FIGS. 12, 13 and 14. FIG. 12 is a timing chart with respect to the main scan, and FIG. 13 is a timing chart with respect to the sub scan. FIG. 14 is a timing chart which illustrates the entire area designation (or area filling) operation.

First, the area filling process of FIG. 10A is described, in which the main scanning direction is rightward, and the sub scanning direction is downward. The pixel data Dn as shown in FIG. 12(c) is supplied from the signal processor 31 shown in FIG. 4 to the sampling circuit 32 in response to a pixel clock shown in FIG. 12(b) in a state where the line clock of FIG. 12(a) is maintained at a high level. The sampling circuit 32 samples the pixel data Dn in response to the sampling clock S-CLK shown in FIG. 12(d). "Dn" denotes single pixel data at an n-th column in each of the lines (rows). During the time when the rightward main scanning direction is selected, the control signal BACK is kept at the low level as shown in FIG. 14(d). Therefore, the selector 41 selects the sampled pixel data supplied from the sampling circuit 32. At this time, the control signal LINE1 is kept at the low level as shown in FIG. 13(c). Therefore, the selector 42 selects the sampled pixel data from the selector 41, and supplies the latch circuit 43 with the sampled pixel data for every single pixel. Pixel data D latched in the latch circuit 43 is shown in FIG. 12(e). As shown, the pixel data Dn is latched for every eight-bits. Then the pixel data D in the latch circuit 43 is read out and written in the frame memory 33 in accordance with the X and Y addresses as shown in FIGS. 12(f) and 12(d), respectively. During the area filling operation, the control signal WR is maintained at the high level as shown in FIG. 14(b). Therefore, the write enable signal $\overline{WE}$ from the NAND gate 59 is maintained at the high level. Further, the pixel data D from the latch circuit 43 is written in the line memory 44 in accordance with the X address of FIG. 12(f). At this time, the line signal LINE0 is kept at the high level, and therefore the write enable signal $\overline{WE0}$ is at the low level.

The line memory 47 stores the result of the aforementioned formula (1) with respect to two adjacent lines. One of the two lines is a line which includes the pixel data A and B, and the other line is a line which includes the pixel data C and D. That is, the line memory 47 consists of two line memories each having a memory capacity of one line. Hereinafter, the two line memories are referred to as first and second line memories.

The pixel data D is latched in the latch circuit 43. Simultaneously, the pixel data B is read out from the second line memory out of the line memory 47 and is latched in the latch circuit 49. Further, the pixel data C supplied from the OR gate 45 is latched in the latch circuit 48. Then the pixel data B and C are read out from the latch circuits 49 and 48, respectively, and are supplied to the AND circuit 55. The result of the AND operation is supplied to the OR gate 45, to which the pixel data D is supplied from the latch circuit 43. The result of the OR circuit 45, which corresponds to the result of the formula (1), is supplied to the line memory 46, the OR gate 50 and the line memory 47. During the time when the rightward main scanning direction is selected, the control signal LINE0 is maintained at the high level as shown in FIG. 13(b). Therefore, the output signal of the OR gate 45 is written into a pixel area of the line memory 46 designated by the X address. Likewise, the output signal of the OR gate 45 is written into a pixel area in the first line memory out of the line memory 47 designated by the X address. In this manner, the area filling process with respect to one line which is scanned rightward, is carried out.

When the area filling process with respect to the above one line is completed, the area filling process with respect to the same line continues with the main scanning direction switched to the leftward direction. This area filling process is carried out during a space time generated by the sampling in the sampling circuit 32. In area filling processing where the leftward main scanning direction is selected, the control signal LINE1 is maintained high, the EOR 61 inverts the X address from the address timing controller 53. The inverted X address is shown in FIG. 12(g). The selector 42 selects the pixel data read out from the line memory 44. Then the logic operation defined by the formula (1) is carried out. The operation result appearing at the OR gate 45 is supplied to the OR gate 50. At this time, the write operation of the line memory 46 is inhibited, because the control memory LINE0 is maintained at the low level as shown in FIG. 13(b). When the operation result is supplied from the OR gate 45 to the OR gate 50, the pixel data having the same address as the above operation result with respect to the pixel data D is read out from the line memory 46, and is supplied to the OR gate 50. An output signal of the OR gate 50 is supplied to the area memory 35 through the OR gate 54. At this time, data designated by the X and Y addresses is applied to the OR gate 54 via the latch circuit 52. However, since the area memory 35 initially stores 0, the output signal of the OR gate 50 passes through the OR gate 54 as it is.

In the above-described operation, pixel data in one line is sequentially processed rightward, and then leftward. When area filling processing with respect to one line ends, the next line is processed. In this manner, when all the lines are completely processed, or in other words, the up-to-down sub scan is completed, the area memory 35 has a figure image made up of the areas 1, 2 and 3 shown in FIG. 9 which are all filled with 1. The operation with respect to the area filling processing based on the combinations of the scanning directions shown in FIGS. 10A and 10B (indicated by OP1 in FIG. 14) is carried out in synchronism with the scan of the edit area sheet.

After the up-to-down sub scan ends, the sub scanning direction is switched to the upward sub scanning direction. The down-to-up sub scan is carried out by using the pixel data stored in the frame memory 33. During the down-to-up sub scan, the control signal BACK is kept at the high level as shown in FIG. 14(d). Therefore, the selector 41 selects the frame memory 33. The Y address generated by the address timing controller 53 is inverted by the EOR gate 62, and is then supplied to the frame memory 33 and area memory 35. Each line is processed rightward, and then leftward, in a state where the up-to-down sub scan is selected. When the up-to-down sub scan ends, the down-to-up sub scan is selected. Then each line is processed rightward and then leftward. Every time when the operation result is obtained at the OR gate 45 in the state where down-to-up sub scan is selected, the corresponding data which has the same address as the above operation result, is read out from the area memory 35 and is sent to the OR gate 54 via the latch circuit 52. Then the OR operation result at the OR gate 54 is written into the same memory position. When the down-to-up sub scan (OP2 of FIG. 14) is completed, the area of FIG. 9 which is filled with 1 is obtained. The area thus obtained is the rectangular edit area, which is then supplied to the edit circuit 37 after a wait duration W shown in FIG. 14. On the other hand, the edit circuit 37 is supplied with desired background image data derived from the background image data generator 35, and with pixel data supplied from the signal processor 31.

Figure 15A:
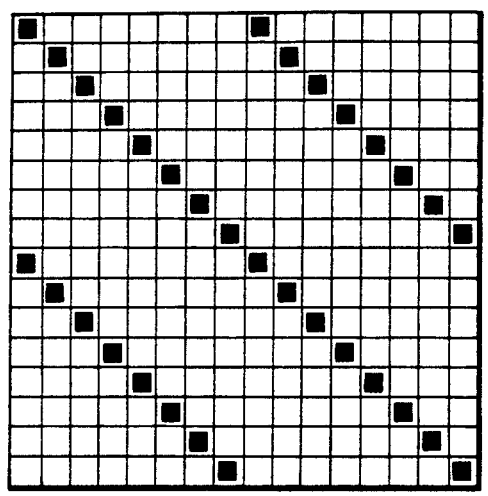
FIGS. 15A and 15B are views of background image patterns.
Figure 15B:
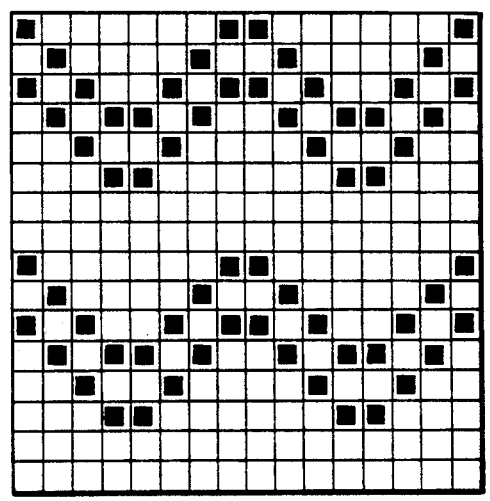

The background image data generator 35 can generate a background image as shown in FIG. 15A. The illustrated background image is a unit pattern which consists of $16 \times 16$ bits amounting to 2 mm $\times$ 2 mm. FIG. 15B shows another background image having a wave form.

The edit circuit 37 carries out a predetermined logic operation on the background image data, the designated area data and the document image data. Then edited image data is supplied to the print unit 23, which then drives the printer processor 24. The duration of the edit operation and so on is shown by OP3 in FIG. 14.

Figures 16A, 16B, 16C, 16D:
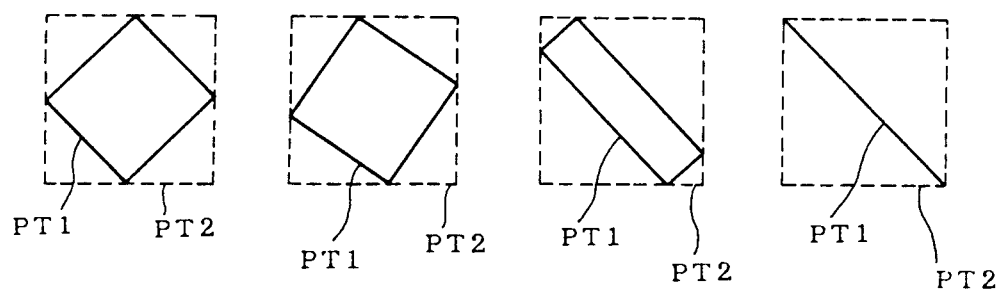
FIGS. 16A through 16D are symbolic views which illustrate variations of figures drawn by hand on the edit area document.

FIGS. 16A through 16D show variations of the figure which can be used for the edit area designation. In FIGS. 16A through 16D, PT1 indicates a figure on the edit area sheet, and PT2 indicates a rectangular area generated from the figure PT2 by the aforementioned area filling process. It can be seen that the same rectangular edit area PT2 can be generated even when the illustrated figures PT1 are written on the edit area document. As can be seen in FIG. 16D, it is possible to use a single diagonal line to thereby designate the edit area.

In the aforementioned embodiment, the rightward main scan and the leftward main scan are alternately carried out on each line. Alternatively, image data from the edit area sheet can be processed in the sequence of the modes shown in FIGS. 10A through 10D.

In the embodiment, it is possible to invert image data of the rectangular edit area read out from the area memory 35. Inverted image data of the rectangular edit area designates an outer area outside the rectangular edit area. By the use of the inverted image data of the rectangular edit area, it becomes possible to delete document data within the rectangular edit area.

In the embodiment, the area filling processing uses the aforementioned formula (1). Alternatively, the value of the pixel data D may be determined by referring to additional adjacent pixel data included in the preceding and following the line having the pixel data D.

The present invention is not limited to the aforementioned embodiment, and variations and modification may be made without departing from the scope of the present invention.

What is claimed is:

1. A method for forming a rectangular area having a pre-existing figure inscribed therein, the rectangular area having exactly four sides regardless of the shape of the pre-existing figure, the method comprising the steps of:

a) scanning a sheet on which is inscribed the pre-existing figure, and outputting pixel data representing the figure, each pixel datum of the pixel data being one binary digit;
   b) storing the pixel data in a first memory;
   c) scanning the pixel data in the first memory in accordance with each of four combinations of directions defined by main and sub scanning directions and, for each of the four combinations, reading out a pixel datum relating to a pixel of concern and pixel data relating to at least two pixels adjacent thereto;

d) performing, for each of the combinations, a first logic operation on the pixel datum relating to the pixel of concern and the pixel data relating to at least the two pixels adjacent thereto, and outputting results of the first logic operation obtained for the four combinations;

e) storing the results of the first logic operation in a second memory; and f) performing a second logic operation on the results of the first logic operation obtained for the four combinations, and outputting a result of the second logic operation which forms the rectangular area in which the figure is inscribed, wherein the rectangular area may have pixels other than the pixels of the pre-existing figure.

2. The method of claim 1, wherein:
the first memory includes a bit map memory having n rows and m columns (where n and m are integers) which stores the pixel data, including the pixel datum relating to the pixel of concern and the pixel data relating to at least the two pixels adjacent thereto;

the pixel data relating to at the least the two pixels has a first pixel datum and a second pixel datum;

the first pixel datum relates to a pixel located at a position of the bit map memory which precedes the pixel of concern by one column in the main scanning direction and which is located in the same row as the pixel of concern; and the second pixel datum relates to a pixel located at a position of the bit map memory which precedes the pixel of concern by one row in the sub scanning direction and which is located in the same column as the pixel of concern.

3. The method of claim 2, wherein step (d) includes:
calculating a formula; wherein
B is the pixel datum relating to the second pixel;
C is the pixel datum relating to the first pixel; and
D is the pixel datum relating to the pixel of concern.

4. The method of claim 1, wherein:
the pre-existing figure drawn on the sheet is a closed-loop figure which is inscribed in the rectangular area to be formed.

5. The method of claim 1, wherein:
the pre-existing figure drawn on the sheet is a diagonal line which is inscribed in the rectangular area to be formed and which connects two corners of the rectangular area.

6. The method of claim 1, wherein step (f) includes:
logically adding the results of the first operation obtained for the four combinations.

7. The method of claim 1, wherein the four combinations defined by the main and sub scanning directions comprise:
a first combination composed of a rightward direction of the first memory corresponding to the main scanning direction, and a downward direction corresponding to the sub scanning direction;
a second combination composed of a leftward direction opposite to the rightward direction, and the downward direction;
a third combination composed of the rightward direction, and an upward direction opposite to the sub scanning direction; and
a fourth combination composed of the leftward direction, and the upward direction.

8. The method of claim 1, wherein:
the sheet comprises a transparent or semitransparent sheet.

9. The method of claim 1, wherein:
the rectangular area formed by the result of the second operation is filled with identical data.

10. The method of claim 9, wherein:
the identical pixel data are binary ones.

11. An apparatus for forming a rectangular area having a pre-existing figure inscribed therein, the rectangular area having exactly four sides regardless of the shape of the pre-existing figure, the apparatus comprising:

a) scanning means for scanning a sheet on which is inscribed the figure, and for outputting pixel data representing the figure, each pixel datum of the pixel data being one binary digit;

b) first memory means for storing the pixel data output by the scanning means;

c) means for scanning the pixel data in the first memory means in accordance with each of four combinations of directions defined by main and sub scanning directions, and, for each of the four combinations, reading out a pixel datum relating to a pixel of concern and pixel data relating to at least two pixels adjacent thereto;

d) first operation means, for each of the combinations, for performing a first logic operation on the pixel datum relating to the pixel of concern and the pixel data relating to at least the two pixels adjacent thereto, and for outputting results of the first logic operation obtained for the four combinations;

e) second memory means for storing the results of the first logic operation output by the first operation means; and f) second operation means for performing a second logic operation on the results of the first logic operation obtained for the four combinations and stored in the second memory means, and for outputting a result of the second logic operation which forms the rectangular area in which the figure is inscribed, wherein the rectangular area may have pixels other than the pixels of the pre-existing figure.

12. The apparatus of claim 11, wherein:
the first memory means comprises a bit map memory having n rows and m columns (where n and m are integers) which stores the pixel data including the pixel datum relating to the pixel of concern and the pixel data relating to at least two pixels adjacent thereto;

the pixel data relating to the at least two pixels has a first pixel datum and a second pixel datum;

the first pixel datum relates to a pixel located at a position of the bit map memory which precedes the pixel of concern by one column in the main scanning direction and which is located in the same row as the pixel of concern; and the second pixel datum relates to a pixel located at a position of the bit map memory which precedes the pixel of concern by one row in the sub scanning direction and which is located in the same column as the pixel of concern.

13. The apparatus of claim 12, wherein the first operation means includes:
means for calculating a formula; wherein
B is the pixel datum relating to the second pixel;
C is the pixel datum relating to the first pixel; and
D is the pixel datum relating to the pixel of concern.

14. The apparatus of claim 11, wherein:

the pre-existing figure drawn on the sheet is a closed-loop figure which is inscribed in the rectangular area to be formed.

15. The apparatus of claim 11, wherein:
the pre-existing figure drawn on the sheet is a diagonal line which is inscribed in the rectangular area to be formed and which connects two corners of the rectangular area.

16. The apparatus of claim 11, wherein the second operation means includes:
means for logically adding the results of the first operation obtained for the four combinations.

17. The apparatus of claim 11, wherein the four combinations defined by the main and sub scanning directions comprise:
a first combination composed of a rightward direction of the first memory corresponding to the main scanning direction, and a downward direction corresponding to the sub scanning direction;
a second combination composed of a leftward direction opposite to the rightward direction, and the downward direction;
a third combination composed of the rightward direction, and an upward direction opposite to the sub scanning direction; and
a fourth combination composed of the leftward direction, and the upward direction.

18. The apparatus of claim 11, wherein:
the sheet comprises a transparent or semitransparent sheet.

19. The apparatus of claim 11, wherein:
the rectangular area formed by the result of the second operation is filled with identical data.

20. The apparatus of claim 19, wherein:
the identical pixel data are binary ones.

21. The apparatus of claim 11, further comprising:
third memory means for storing image data showing an image to be printed;
background image data generating means for generating background image data showing a background image; and
edit means, coupled to the third memory means, the background image data generating means and the second operation means, for generating a print signal showing the image represented by the image data in the rectangular area having the background image represented by the background image data.

22. The apparatus of claim 21, further comprising:
print means for receiving the print signal and for recording an image formed by the print signal on a recording media.

* * * * *